United States Patent
Maalout et al.

(10) Patent No.: US 12,428,993 B2
(45) Date of Patent: Sep. 30, 2025

(54) HEAT EXCHANGER PROVIDED WITH AN AIR DIFFUSION SYSTEM AND CORRESPONDING TURBOMACHINE

(71) Applicant: SAFRAN, Paris (FR)

(72) Inventors: Samer Maalout, Moissy-Cramayel (FR); Ephraim Toubiana, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/834,706

(22) PCT Filed: Jan. 27, 2023

(86) PCT No.: PCT/FR2023/050110
§ 371 (c)(1),
(2) Date: Jul. 31, 2024

(87) PCT Pub. No.: WO2023/148444
PCT Pub. Date: Aug. 10, 2023

(65) Prior Publication Data
US 2025/0035040 A1    Jan. 30, 2025

(30) Foreign Application Priority Data

Feb. 1, 2022   (FR) ........................................ 2200885

(51) Int. Cl.
*F02C 7/18*   (2006.01)
(52) U.S. Cl.
CPC .......... *F02C 7/18* (2013.01); *F05D 2260/213* (2013.01)
(58) Field of Classification Search
CPC ................. F02C 7/18; F05D 2260/213; F05D 2260/221; F05D 2260/22141; F28F 13/08; F28D 7/106
See application file for complete search history.

(56) References Cited

U.S. PATENT DOCUMENTS 4,254,618 A * 3/1981 Elovic ................. F28D 21/0014
60/39.83
7,861,512 B2 * 1/2011 Olver ...................... F02C 7/141
60/39.08
(Continued)

FOREIGN PATENT DOCUMENTS

DE    102019119416 A1   1/2021
EP        1898069 A2    3/2008
(Continued)

OTHER PUBLICATIONS

International Search Report and Written Opinion received for PCT Patent Application No. PCT/FR2023/050110, mailed on May 8, 2023, 15 pages (7 pages of English Translation and 8 pages of Original Document).

*Primary Examiner* — Hoang M Nguyen
(74) *Attorney, Agent, or Firm* — WOMBLE BOND DICKINSON (US) LLP

(57) ABSTRACT

A heat exchanger for a turbomachine, in particular an aircraft turbomachine, having a longitudinal axis, including a supporting wall extending in a first direction; a plurality of fins, each of which rises in a second direction from the supporting wall and being intended to be swept by an air stream, and a profiled panel covering the fins and extending in the first direction between a first diverging-profile wall upstream of the fins and a second converging-profile wall downstream of the fins. The heat exchanger includes an air intake device configured to slow the air stream in a third direction, the device having multiple separate air intake openings which are arranged upstream of the fins in the first direction and which are distributed in the third direction.

15 Claims, 8 Drawing Sheets

(56) References Cited

U.S. PATENT DOCUMENTS

| | | | |
|---|---|---|---|
| 8,763,363 B2 * | 7/2014 | Ranganathan | F28D 9/00 |
| | | | 60/39.511 |
| 10,125,684 B2 * | 11/2018 | Yu | F02C 7/18 |
| 2008/0053059 A1 | 3/2008 | Olver et al. | |
| 2022/0205390 A1 | 6/2022 | Toubiana et al. | |
| 2022/0235704 A1 | 7/2022 | Toubiana et al. | |
| 2023/0043809 A1 * | 2/2023 | Schimmels | F28D 7/16 |

FOREIGN PATENT DOCUMENTS

| | | |
|---|---|---|
| FR | 3096409 B1 | 4/2021 |
| FR | 3096444 B1 | 5/2021 |
| WO | 2020/234525 A2 | 11/2020 |

* cited by examiner

HEAT EXCHANGER PROVIDED WITH AN AIR DIFFUSION SYSTEM AND CORRESPONDING TURBOMACHINE

FIELD OF THE INVENTION

The present invention relates to the general field of the aeronautic. In particular, it is aimed at a heat exchanger for a turbomachine, in particular an aircraft.

TECHNICAL BACKGROUND

An aircraft turbomachine and an aircraft comprise various members and/or items of equipment that need to be lubricated and/or cooled for their proper operation. These members and/or item of equipment may be bearings or gears in the turbomachine or electrical and/or electronic components for electrical systems in the aircraft turbomachine or systems for conditioning the interior spaces of the aircraft. The heat generated by these members and/or item of equipment, which may be very high depending on the power of the member and/or item of equipment, is evacuated by heat exchange with a cold source available in the turbomachine and/or the aircraft.

The heat exchange is achieved using one or more heat exchangers installed in the turbomachine or the aircraft for various applications. Examples of heat exchangers are described in the documents EP-A2-1898069 and DE-A1-10 2019 119416.

Depending on the application, the heat exchangers generally use a cold source, which may be ambient air, air from the secondary vein of the turbomachine, glycoled water, a heat transfer fluid such as Novec®, hydrofluorocarbons (HFCs), liquefied natural gas (LNG), liquid hydrogen (LH2), etc., and a hot source, which may be the fuel of the turbomachine, oil, bleed air taken from the low-pressure or high-pressure compressor of the turbomachine, or air from the primary vein of the turbomachine.

Cooling requirements for lubricating fluids and electrical and/or electronic systems (electrical machines, generators, batteries, etc.) are growing all the time, due to the increase in rotation speeds and power required to meet the turbomachine specifications and the electrification of future aircrafts. This means that the heat exchangers will be under increasing stress.

In addition, the new turbomachine and aircraft architectures using alternative fuels ((LH2), (LNG)) which are stored in liquid form at low temperature (typically 23K for LH2) to limit the volume of the tanks and the weight added to the aircraft mean that they need to be heated before being used, which means using heat exchangers.

The Fuel Cooled Oil Coolers (FCOC) are generally known as fuel/oil heat exchangers. These heat exchangers FCOC may have the dual function of heating the fuel before combustion in the combustion chamber of the turbomachine and cooling the oil heated by the heat dissipation of the turbomachine. However, the heat exchangers FCOC are not sufficient to absorb all the thermal dissipations because the temperature of the fuel is limited for safety reasons. Additional cooling is provided by air/oil heat exchangers known by the acronym ACOC for "Air-Cooled Oil Cooler", in particular those of the surface type known by the acronym SACOC. The surface heat exchangers are usually arranged in the secondary vein of the turbomachine and use the secondary air stream to cool the oil circulating in the turbomachine. These heat exchangers are in the form of a metallic surface part allowing the passage of oil in machined channels. The secondary air stream is guided along fins carried by this surface part and which have the role of increasing the contact surface with the secondary air stream and extracting the calories.

One of the problems observed in heat exchangers for the various applications mentioned above is the generation of additional pressure drops on the air (or gas) side, since they disturb the flow. This increases the specific fuel consumption (SFC) of the turbomachine and has a negative impact on the performance of the turbomachine.

The examples of heat exchangers described in the patents FR-B1-3096444 and FR-B1-3096409 (also published under number WO-A1-2020/234525) on behalf of the applicant, have been proposed to improve their performance, particularly in aerothermal applications. One of these heat exchangers shown in FIG. 1 comprises a wall Pr for decelerating down the air stream entering the fins A1 and a wall Pa for accelerating the air stream leaving the fins. In order to achieve significant deceleration, the ratio between the cross-section hi at the intake of the deceleration wall Pr and the height he of the fins A1, and the ratio between the outlet cross-section hs of the acceleration walls Pa and the height he of the fins A1 must both be high. However, with such a deceleration wall Pr, there is a risk of delamination in the area B if the air entering the heat exchanger is poorly distributed. A risk of delamination of the parietal boundary layer could also occur at the level of the external surfaces of the deceleration and acceleration walls which are in direct contact with the air stream F2 bypassing the heat exchanger (the air stream F2 being at high Mach (approximately 0.5 to 0.8 at cruise)), and in particular at the level of the areas A and C. All these risks of delamination may increase the total pressure drop. On the other hand, if the deceleration and acceleration walls are too long, for example to ensure a homogeneous flow, this could have an impact on the size of the heat exchanger.

SUMMARY OF THE INVENTION

The aim of the present invention is to provide a heat exchanger that allows better optimization of aerothermal performance while reducing pressure drops and avoiding a considerable impact on mass.

This objective is achieved in accordance with the invention by means of a heat exchanger for a turbomachine, in particular an aircraft turbomachine, having a longitudinal axis, the heat exchanger comprising:
  a support wall extending in a first direction,
  a plurality of fins each rising in a second direction from an external surface of the support wall, the fins being configured to be swept by an air stream in the first direction,
  a first profiled wall arranged upstream of the fins and configured so as to guide and decelerate the air stream entering the heat exchanger,
  a second profiled wall arranged downstream of the fins and configured so as to accelerate the air stream leaving the heat exchanger, and
  a profiled panel covering the fins, the profiled panel extending in the first direction between the first wall and the second wall to which it is attached,
  the heat exchanger comprising an air diffusion system comprising an air intake device configured to decelerate the air stream in a third direction, the device comprising a plurality of separate air intake openings which are arranged upstream of the fins in the first direction and which are distributed in the third direction.

Thus, this solution allows to achieve the above-mentioned objective. In particular, by installing a first wall upstream and an air intake device of a diffusion system with a plurality of openings acting as air intakes at the intake of the heat exchanger, the air stream is doubly decelerated thanks to the variation in cross-section on the one hand, in the second direction (radially) and on the other hand, in the azimuthal direction. In particular, decelerating the speed of the flow at the heat exchanger intake allows to minimize the pressure drop (or even eliminate it) and even generate thrust in certain phases of aircraft flight. This phenomenon is referred as the "Meredith Effect" and significantly improves the aerothermal performance of the heat exchanger. This is because the second wall downstream and the thermal energy related to the air stream further accelerates the air stream leaving the heat exchanger. The pressure drops decreases until it disappears at a passable speed above which the heat exchanger contributes to propulsion. The Meredith effect is a physical phenomenon whereby the drag caused by a heat exchanger heating the air is compensated for by an appropriate design of the channel of the heat exchanger (divergent/exchanger/convergent device) capable of generating more useful thrust. The Meredith effect is all the more tangible as aircraft speed increases. In order to have zero drag and possibly to generate thrust via the heat exchanger in certain phases of flight, the deceleration factor must be greater than 6. This heat exchanger has high aerodynamic performance and high deceleration in a limited overall dimension, so it meets the requirements of the deceleration factor and the Meredith Effect.

The heat exchanger also comprises one or more of the following characteristics, taken alone or in combination:
- the first wall has a first end forming an air inlet with the support wall, the air intake device being located upstream of the plane in which the air inlet is defined.
- the first wall has a first end connected to the support wall, the air intake device being located downstream of the plane in which the first end is defined, the air intake openings being formed in the first wall and being arranged at a predetermined distance from the first end of the first wall.
- the diffusion system comprises an air exhaust device configured to accelerate the air stream in the third direction, the exhaust device comprising a plurality of separate air exhaust openings which are arranged downstream of the fins in the first direction and which are distributed in the third direction.
- the second wall has a first end forming an air outlet with the support wall, the air exhaust device being located downstream of the plane in which the air outlet is defined.
- the second wall has a first end connected to the support wall, the air exhaust device being located upstream of the plane in which the first end is defined, the intake openings being formed in the second wall and being arranged at a predetermined distance from the first end of the second wall.
- the number of air intake openings of the air intake device and/or the air exhaust device is between 1 and 100.
- the intake device and/or the exhaust device comprise a plurality of rows of openings, each row comprising openings which are aligned in the third direction, and the openings of the rows being aligned in the first direction or having an angular offset.
- the heat exchanger comprises a adjustment device of the flow rate, the adjustment device comprising a movable door which is arranged in an opening, the movable door moving in the opening in the first direction and/or in the second direction so as to vary the cross-section of the opening.
- the heat exchanger is annular or extends over an angular sector.

The invention also relates to a turbomachine with longitudinal axis comprising a fan, an annular casing which is centered on the longitudinal axis and which surrounds the fan, and a heat exchanger as aforesaid.

The turbomachine also comprises one or more of the following characteristics, taken alone or in combination:
- the turbomachine comprises a nacelle disposed radially outside the annular casing and around which an external dynamic air is configured to circulate, the heat exchanger being disposed radially outside the nacelle and a portion of the external dynamic air forming the air stream sweeping over the fins.
- the heat exchanger is disposed radially inside the annular casing in which an air stream is configured to circulate, a portion of the air stream forming the air stream sweeping over the fins.
- the nacelle or the annular casing comprises an annular wall which comprises a recess in which the heat exchanger is installed, the fins having a height greater than or equal to the height of the recess.
- the recess is annular or extends over an angular sector around the longitudinal axis.
- the partitions of the intake device and exhaust device extend outside the recess.

The invention further relates to an aircraft comprising a turbomachine as mentioned above.

BRIEF DESCRIPTION OF THE FIGURES

The invention will be better understood, and other purposes, details, characteristics and advantages thereof will become clearer upon reading the following detailed explanatory description of embodiments of the invention given as purely illustrative and non-limiting examples, with reference to the appended schematic drawings in which.

DETAILED DESCRIPTION OF THE INVENTION

Figure 1:
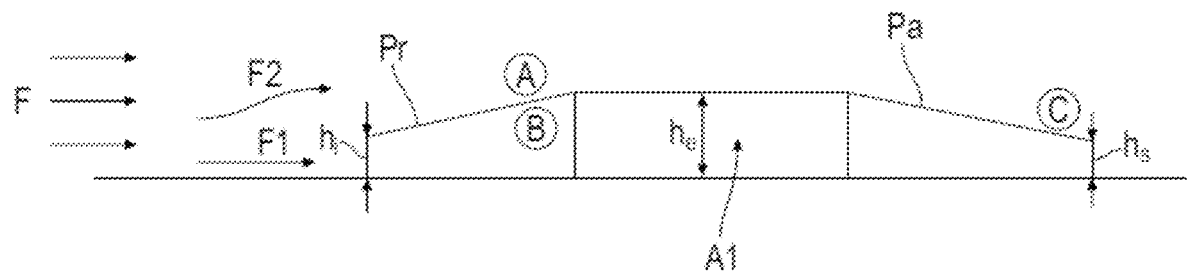
FIG. 1 is a schematic axial cross-sectional view of a heat exchanger according to the prior art.

FIG. 1 shows a prior art heat exchanger, as described above.

Figure 2:
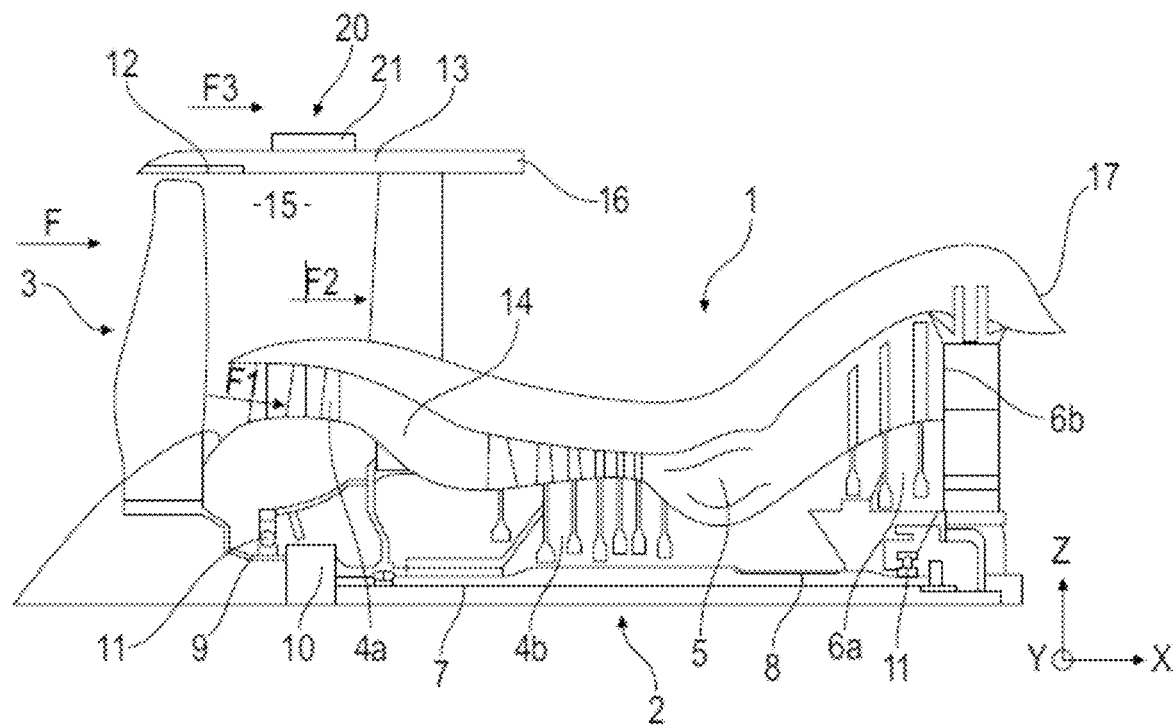
FIG. 2 is an axial cross-sectional view of an example of a turbomachine to which the invention applies.

FIG. 2 shows an axial cross-sectional view of a turbomachine of longitudinal axis X to which the invention applies. The turbomachine shown is a double-flow turbomachine 1 configured to be mounted on an aircraft. Of course, the invention is not limited to this type of turbomachine.

In the present invention, the terms "upstream" and "downstream" are defined in relation to the circulation of the gases in the turbomachine and here along the longitudinal axis X and with reference to FIG. 2 from left to right. Similarly, a turbomachine is usually made up of several modules that are manufactured independently of each other and then assembled together in a way that facilitates its assembling, dismounting and its maintenance.

The turbofan engine 1 generally comprises a gas generator or a gas turbine engine 2 upstream of which is mounted a fan or fan module 3. The gas generator 2 comprises a gas compressor assembly (here comprising a low pressure compressor 4a and a high pressure compressor 4b), a combustion chamber 5 and a turbine assembly (here comprising a high pressure turbine 6a and a low pressure turbine 6b). Typically, the turbomachine 1 comprises a low-pressure shaft 7 which connects the low-pressure compressor 4a and the low-pressure turbine 6b to form a low-pressure body and a high-pressure shaft 8 which connects the high-pressure compressor 4b and the high-pressure turbine 6a to form a high-pressure body. The low-pressure shaft 7, centered on the longitudinal axis, drives a fan shaft 9. A speed reducer 10 may be interposed, as here, between the fan shaft 9 and the low pressure shaft 7. Rotational guide bearings 11 are also used to guide the low-pressure shaft 7, the high-pressure shaft 8 and the fan shaft 9 in rotation relative to a stationary structure of the turbomachine.

The fan 3 is ducted by a fan casing 12. The fan casing 12 is carried by a nacelle 13. This is annular, centered on the longitudinal axis and extends radially outside the fan casing 12. The nacelle 13 is connected to an aircraft tail or a wing of the aircraft directly or via a pylon. The air stream F entering the fan 3 is divided into a primary air stream F1 which flows through the gas generator 2 in a primary vein 14 and a secondary air stream F2 which flows in a secondary vein 15 around the gas generator 2. The secondary air stream F2 is ejected by a secondary nozzle 16 terminating the nacelle 13, while the primary air stream F1 is exhausted outside the turbomachine 1 via an exhaust nozzle 17 located downstream of the gas generator 2.

The guide bearings 11 and the speed reducer 10 in this example configuration of turbomachine 1 must be lubricated and/or cooled to ensure the performance of the turbomachine. The power generated by these is dissipated in a fluid coming from a fluid supply source installed in the turbomachine, which allows to lubricate and/or cool various members and/or items of equipment of the turbomachine. Of course, other turbomachine or aircraft items of equipment has significant thermal energy to transfer, such as heat that needs to be extracted and removed from its environment. These members and/or items of equipment may be one or more electrical machines, generators, batteries, an accessory gearbox, electronic/electrical systems, systems for cooling the inner space of the aircraft, etc. The heat exchanger system is of course also applicable to all cold and hot sources (ambient air, air of primary or secondary vein from the turbomachine, Novec®, HFC, LNG, LH2, etc.).

To this end, the turbomachine 1 comprises a heat exchange system 20 that allows the fluid configured to lubricate and/or cool these members and/or items of equipment to be cooled. In this example, the fluid is an oil and the cold source configured to cool the oil is the air stream flowing in or around the turbomachine 1.

Figure 3:
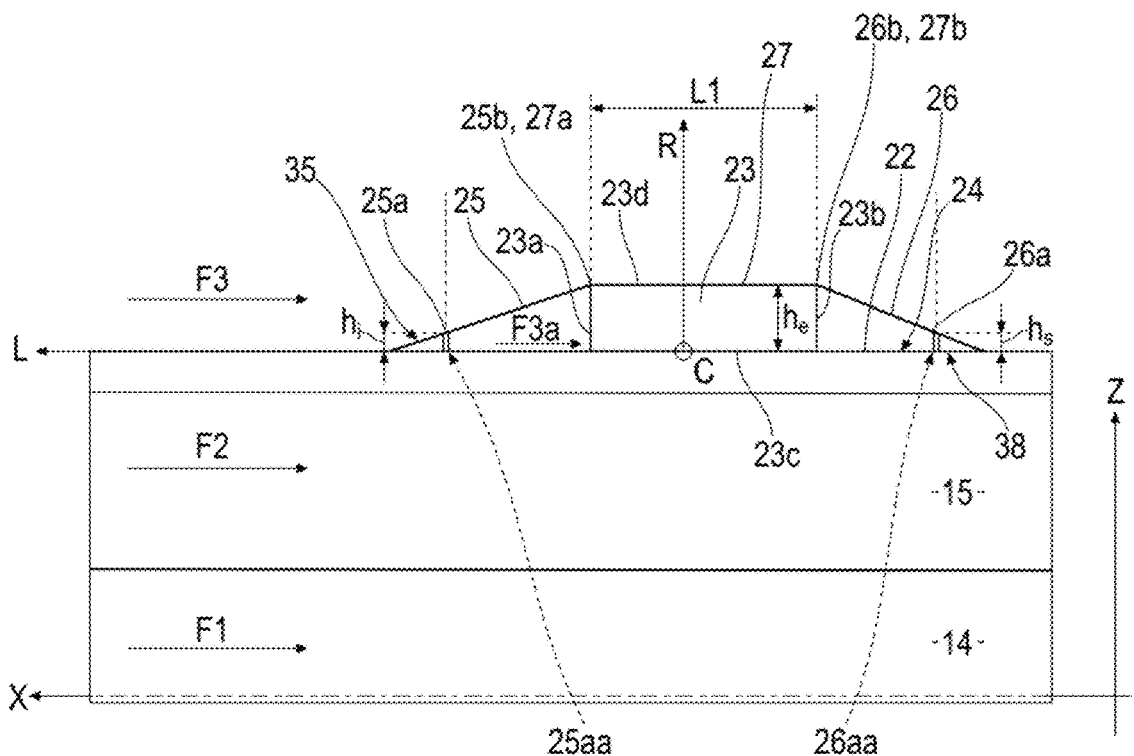
FIG. 3 is a schematic view in axial cross-section of a heat exchanger arranged on the outside of a turbomachine and equipped with an air diffusion system according to the invention.
Figure 4:
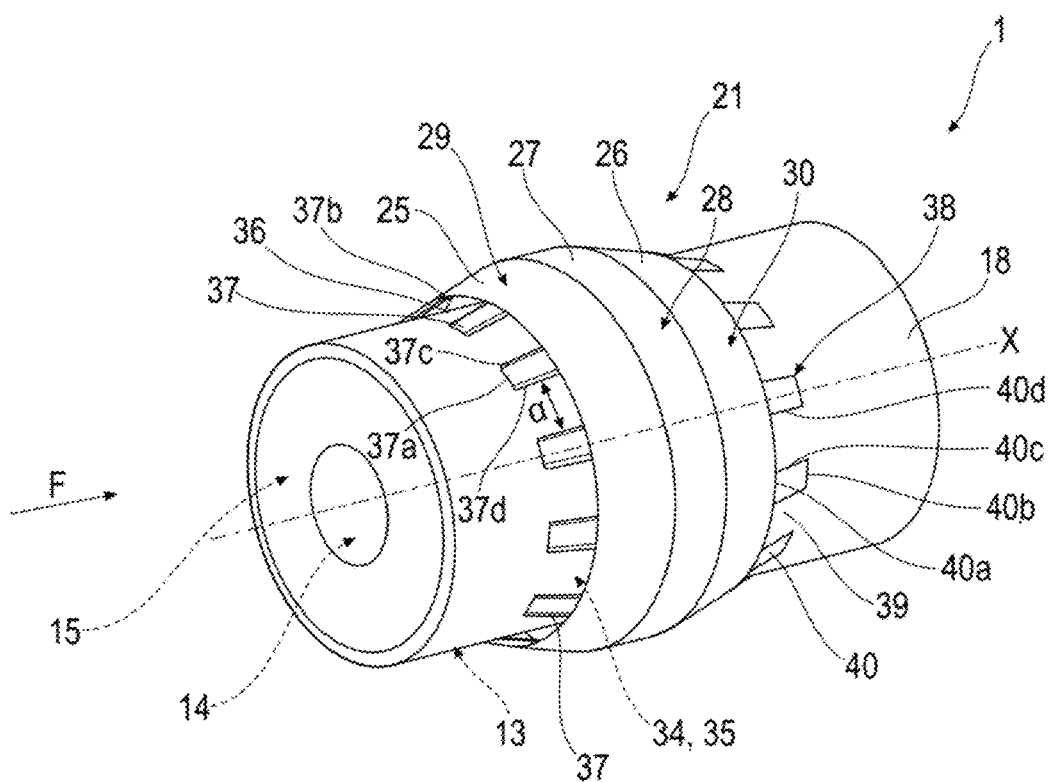
FIG. 4 is a perspective view of an example of a heat exchanger carried by an aircraft turbomachine and equipped with an upstream air intake device and a downstream exhaust device in accordance with the invention.

With reference to FIGS. 3 and 4, the heat exchange system 20 comprises a heat exchanger 21 which is mounted on the outside of the turbomachine 1. In particular, the heat exchanger 21 is carried by the nacelle 13. The heat exchanger 21 is arranged radially outside the nacelle 13. An external dynamic air stream (or ram air) F3 circulates around the nacelle 13 and at least part of this air is configured to pass through the heat exchanger 21.

The heat exchanger 21 comprises a support wall 22 which extends along a first longitudinal direction L. We use the term "direction" to describe the heat exchanger 21 in particular. In the installation situation, the first direction L is parallel to the longitudinal axis X of the turbomachine 1. In the present example, the support wall 22 is annular and centered on the longitudinal axis X. More precisely still, the support wall 22 is formed by a portion of the wall 18 that comprises the nacelle 13.

The heat exchanger 21 also comprises a plurality of fins 23, each of which rises from an external surface 24 of the support wall 22 in a second direction R. The second direction R is perpendicular to the first longitudinal L. The second direction R is parallel to a radial axis Z extending from the longitudinal axis L of the turbomachine 1. The fins 23 also extend in the first direction L. Advantageously, the fins 23 are each continuous and straight. Each fin 23 is generally flat. These are arranged parallel to each other along a third direction C. The third direction is parallel to a circumferential direction around the longitudinal axis X in the installation situation. The fins 23 are configured to be swept by the external dynamic air stream F3 in the first direction L. Alternatively, the fins 23 are discontinuous and staggered (with staggered pitches) in the first direction or in the third direction, or are corrugated in the radial or longitudinal direction.

Each fin 23 has a leading edge 23a and a trailing edge 23b which are opposite each other in the first direction L. Each fin 23 also comprises a first longitudinal rim 23c and a second longitudinal rim 23d which are opposite each other in the second direction R. The first longitudinal rim 23c is connected to the support wall 22. This is also connected to the leading edge 23a and to the trailing edge 23b, as is the second longitudinal rim 23d. Advantageously, each fin 23 in this example has a generally rectangular shape. Alternatively, the fins 23 may be trapezoidal or any other shape.

The fins 23 each have a height he measured between the first longitudinal rim 23c and the second longitudinal rim 23d. The height he of the fins 23 is between 5 mm and 20 mm. Each fin 23 also has a length L1 in the longitudinal direction L. The length L1 is measured between the leading edge 23a and the trailing edge 23b of each fin 23. The length L1 is between 5 cm and 20 cm.

The heat exchanger 21 comprises a first profiled wall 25 arranged upstream of the fins 23 (depending on the flow direction of the air stream along external surface 24 or the first direction L). The first wall 25 is configured so as to direct and guide the air stream F3a (portion of the external dynamic air stream F3) entering the heat exchanger 21. This first wall 25 is also configured to decelerate the air stream F3a entering the heat exchanger 21. The first wall 25 has a diverging-profile.

The first wall 25 is inclined with respect to the first direction L in an axial plane. In particular, the first wall 25 extends between a first end 25a and a second end 25b substantially along the first direction L. The first end 25a forms, upstream, with the support wall 22, an air inlet 25aa which has a first predetermined height hi along the second direction R. The first height hi is less than the radial height he of the fins 23. The second end 25b covers the leading edge 23a of the fins 23. The first wall 25 also extends in the third direction and in this case the first end 25a is annular. In particular, the first wall 25 has a shape of revolution about the longitudinal axis X.

The heat exchanger 21 is also provided with a second profiled wall 26 arranged downstream of the fins 23 so as to reduce the recirculation phenomena that occur downstream of the fins 23. The second profiled wall 26 is also configured to accelerate the stream leaving the heat exchanger 21. The second wall 26 has substantially the same configuration as that of the first wall 25. However, it has a converging-profile. The second wall 26 also extends between a first end 26a and a second end 26b along the first direction L. The first end 26a, downstream, forms with the support wall 22 an air outlet 26aa which has a second predetermined height hs along the second direction. The second height hs is less than the height he of the fins 23. The second end 26b covers the trailing edge 23b of the fins 23.

The ratio between the first height hi and the second height hs is between 0.5 and 1.

The heat exchanger 21 comprises a profiled panel 27 covering the fins 23. In particular, the panel 27 is connected to the second longitudinal rim 23d of each fin 23. In this way, the panel 27 allows to guide and control the flow of the air stream F3a inside heat exchanger 21. The fins 23 are thus arranged radially between the support wall 22 and the profiled panel 27. The profiled panel 27 extends along the first longitudinal direction L. The panel 27 also extends along the third direction C. In the present example, the panel 27 is substantially cylindrical and centered on the longitudinal axis X of the turbomachine when installed in the turbomachine 1. The panel 27 extends radially outwards from the support wall 22.

The panel 27 extends between an upstream edge 27a and a downstream edge 27b along the first longitudinal direction L. The panel 27 has a length (measured between the upstream edge 27a and the downstream edge 27b) which is substantially equal to the length L1 of the fins. The upstream edge 27a of the panel 27 is connected to the second end 25b of the first panel 25. The downstream edge 27b is connected to the second end 26b of the second wall 26. The panel 27 extends in the first direction L between the first panel 25 and the second panel 26.

With reference to FIG. 4, the panel 27 has an external surface 28 having a surface continuity with an external surface 29 of the first wall 25. The external surface 28 also has a surface continuity with an external surface 30 of the second wall 26.

The heat exchanger 21 may be equipped with support elements (not shown) allowing to attach the first wall 25 and/or the second wall 26 to the support wall 22. These support elements are positioned at a distance from the fins 23, upstream of the fins 23 and/or downstream of the fins 23.

In FIG. 4, the heat exchanger 21 comprises an air diffusion system. The diffusion system comprises an air intake device 35 configured so as to decelerate the air stream entering the exchanger in the third direction C. The air intake device 35 comprises several air intake openings 36 which are distinct and arranged upstream of the fins 23 in the first direction. Advantageously, the openings 36 are distributed along the third direction C and around the longitudinal axis X. These openings 36 are formed by partitions 37 which are spaced apart from one another and which are distributed around the third direction C. Each air intake opening 36 is delimited along the third direction by two partitions 37 spaced apart along the third direction C. In other words, the intake openings 36 extend over an angular sector a (alpha) of between 1 and 360°. The openings 36 (and the partitions 37) are distributed azimuthally and preferably equidistantly. The partitions 37 extend upstream from the first end 26a of the first wall 25 until the support wall 22. In other words, the partitions 37 extend the first wall 25 and are connected to the support wall 22.

Each partition 37 is flat and slightly curved so as to follow the aerodynamic profile of the first wall 25 and not disturb the air stream. More precisely still, each partition 37 comprises an upstream edge 37a connected to the support wall 22 and a downstream edge 37b connected to the first end 25a of the first wall 25. The height of the downstream edge 37a is greater than the height of the upstream edge, which is in the form of a top (connected to the support wall or annular wall 18). Each partition 37 also extends between a first lateral edge 37c and a second lateral edge 37d in the third direction C. Each partition has a thin wall thickness of between 0.2 and 2 mm. The partitions have such a configuration, and in particular such a profile, in order to minimize the disturbance and consequently the corresponding pressure drop. The air stream may circulate below the partition.

The openings 36 open into the air inlet 25aa formed by the first end 25a and by the support wall 22. The air stream F3a enters through each intake opening 36 (air intakes), circulates under the first wall 25 and then passes through the fins 23. The air entering the heat exchanger 21 is doubly decelerated by the openings 36 and the front wall 25. In particular, the air stream F3a entering through the intake openings 36 occupies part of the circumference of the heat exchanger 21. As we have seen, each opening 36 extends over an angular sector a and the sum of the angular sectors is defined as αT between 1° and 360° (not the whole circumference) (360°). The air stream F3 at the level of the air inlet 25aa of the first wall 25 is distributed over the entire circumference of the first wall 25 (i.e.) 360°. This implies a variation in the cross-section of the air stream passage between the radial plane passing through 37a (whose sum of angular sectors is αT) and the radial plane passing through the air inlet 25aa, which occupies the entire 360° circumference. This variation in cross-section corresponds to the ratio 1/αT. If the ratio is 0.5 (the intake openings 36 occupy 50% of the circumference), there will be a ratio of increase in cross-section of 2 between the air intake cross-section (at level 37*a*) and the intake cross-section (at air inlet 25*aa*), resulting in a deceleration in the flow in the azimuthal direction by a factor of 2. Added to this is the deceleration due to the variation in cross-section in the radial direction, hence the notion of "double deceleration".

The number of air intake openings 36 of the air intake device 35 is between 1 and 100. This number depends on a number of factors (type of application, angular sector occupied by the heat exchanger 21, section change ratio in the second radial, shape of the heat exchanger (annular, cubic or other), etc.).

Figure 5:
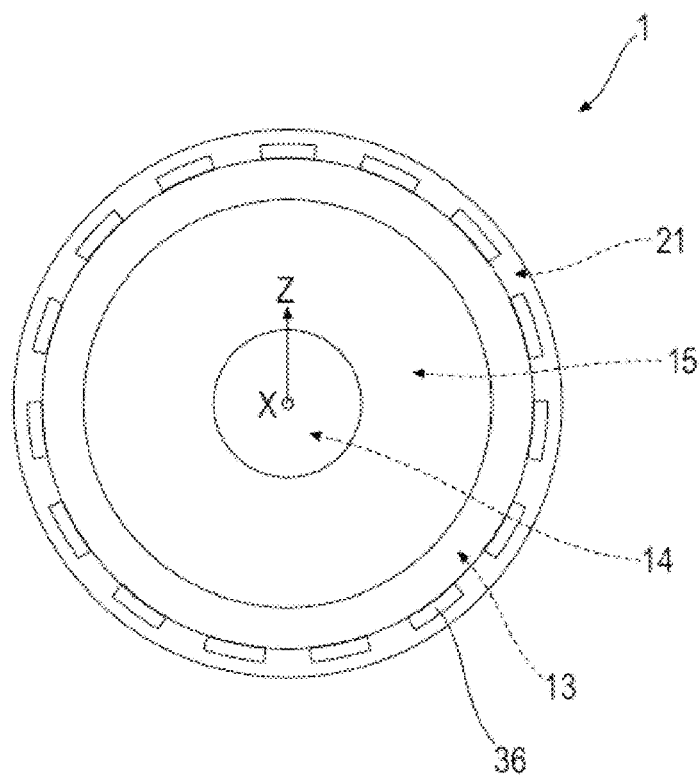
FIG. 5 shows a radial cross-section of the heat exchanger shown in FIG. 4.

In FIG. 5, the intake device 35 comprises 15 (fifteen) intake openings 36 evenly distributed around the longitudinal axis.

Figure 6:
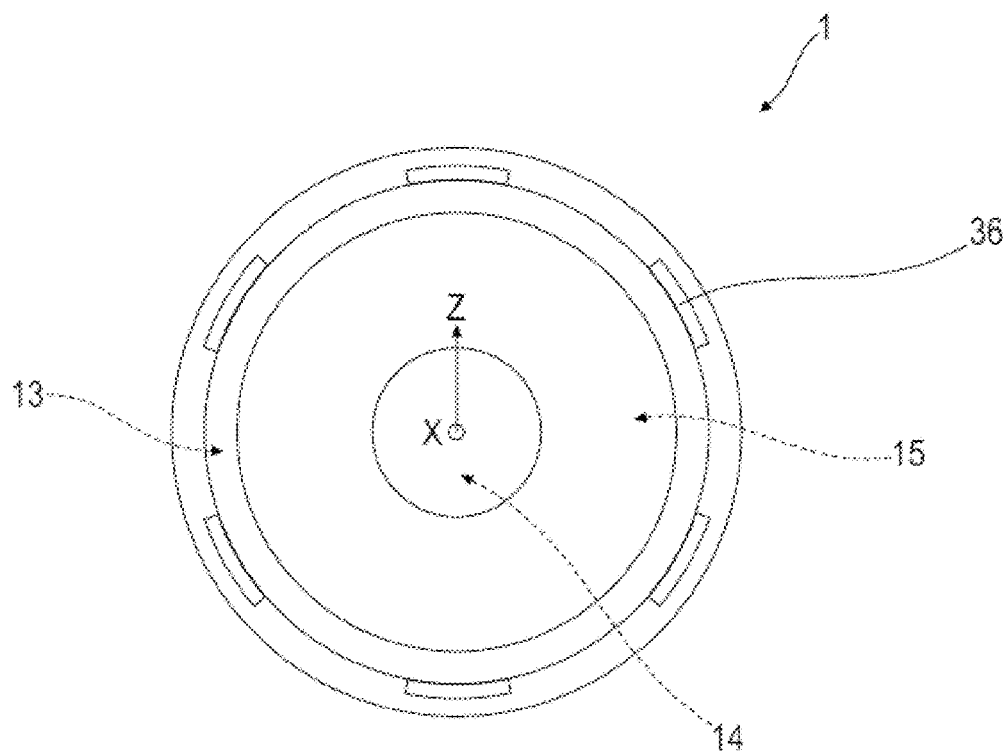
FIG. 6 shows another embodiment of a heat exchanger equipped with an air diffusion system according to the invention.

In FIG. 6, the device 35 comprises 6 (six) openings 36.

The diffusion system of the heat exchanger 21 also comprises an air exhaust device 38 located downstream of the fins 23. The air exhaust device 38 has a similar configuration to that of the intake device 35. In particular, the device 38 comprises exhaust openings 39 which are evenly distributed around the third direction C (and longitudinal axis X) and which are separated by partitions 40. Each partition 40 rises from the external surface 24 in the second direction R. Each partition 40 comprises an upstream edge 40*a* connected to the first end 26*a* of the second wall 26 and a downstream edge 40*b* connected to the support wall 22. The upstream edge 40*a* is higher than the downstream edge 40*b*. The downstream edge 40*b* is also in the form of a top. Each partition 40 also extends between a first lateral edge 40*c* and a second lateral edge 40*d* in the third direction. The openings 39 open into the air outlet 26*aa* formed by the support wall 22 and the first end 26*a* of the second wall 26. In this way, the air leaving the fins 23 circulates under the second wall 26 and into the exhaust openings 39 of the device 38. In this embodiment, the number of intake openings 36 and exhaust openings 39 is identical but may be different.

Figure 7:
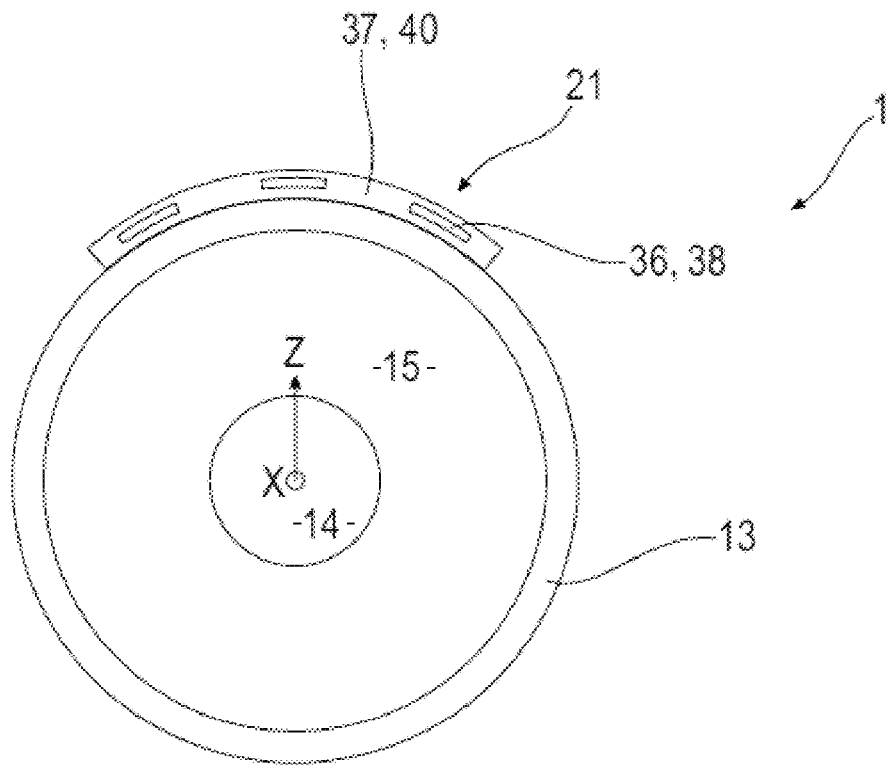
FIG. 7 illustrates schematically and in radial cross-section another example of embodiment of a heat exchanger according to the invention.

FIG. 7 illustrates an embodiment of a heat exchanger 21. The elements that are identical and/or have the same function in the previous embodiment are represented by the same numerical references. This heat exchanger 21 differs from the previous heat exchanger in that it extends over an angular sector in the third direction. The angular sector is less than 360°. By way of example, the heat exchanger 21 extends over an angular sector of between 25° and 120°. The first wall 25, the second wall 26 and the panel 27 have the same width in the third direction. The width of the panel 27 is equal to or greater than the distance over which the fins 23 are arranged side by side. In this example, the heat exchanger 21 comprises an air intake device 35 upstream of the first wall 25 and an air exhaust device downstream of the second wall 26. Each of the devices 35, 38 comprises three openings 36, 39 which are separated by four partitions 37, 40. Of course, the number of intake openings 36 may be different from the number of exhaust openings 39.

Figure 8:
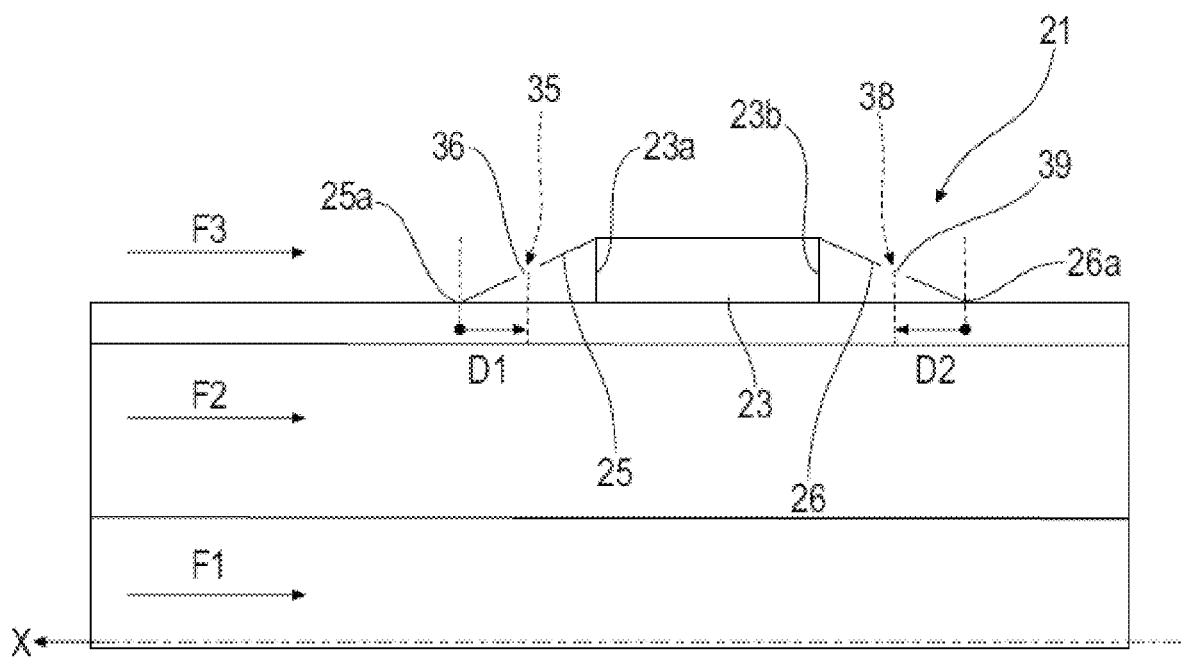
FIG. 8 is a schematic axial cross-sectional view of another example of embodiment of a heat exchanger according to the invention.
Figure 9:
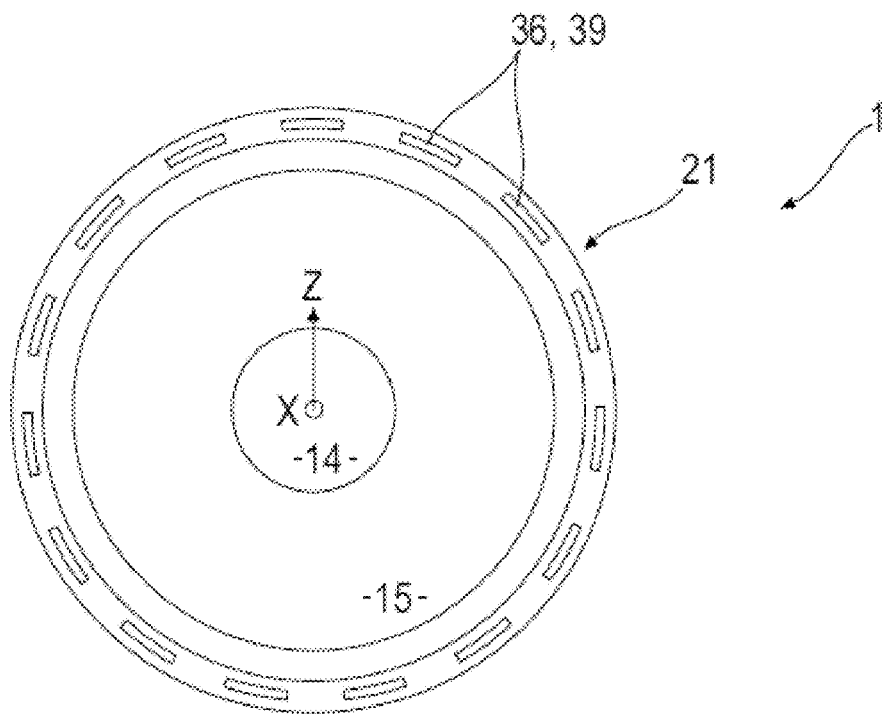
FIG. 9 shows a radial cross-section of the heat exchanger shown in FIG. 8.

FIGS. 8 and 9 illustrate yet another embodiment of heat exchanger 21. The elements that are identical and/or have the same function in the previous embodiment are represented by the same numerical references. This embodiment differs from the embodiment shown in FIGS. 2 to 7 in that the air intake device 35 is located downstream of the plane in which the first end 25*a* is defined. The first end of the first wall is connected to the support wall 22. Here, each air intake opening 36 is formed in the first wall 25. In other words, the air stream enters the heat exchanger 21 only through the openings 36 (the heat exchanger has no partition). If the heat exchanger 21 is annular, the first wall 25 is annular. Alternatively, the heat exchanger 21 and the first wall 25 extend over an angular sector.

The openings 36 pass transversely through the first wall 25 on either side and open upstream of the leading edges 23*a* of the fins 23. Each intake opening 36 is arranged at a predetermined distance D1 from the first end 25*a* of the first wall 25. Similarly, the device 38 is located upstream of the plane in which the first end 26*a* is defined. In this embodiment, the air stream entering through the openings 36 circulates in two directions, namely in a radial direction and in an axial direction. The air stream may circulate underneath the first wall 25 to the end 25*a* and then be directed axially towards the fins 23. This results in a double deceleration. In an advantageous but non-limiting characteristic, the heat exchanger comprises attachment supports arranged between the first wall 25 and the support wall 22, and downstream of the openings 36. These attachment supports ensure the mechanical strength of the heat exchanger.

The heat exchanger 21 in this embodiment also comprises an exhaust device 38. The second wall 26 is connected to the support wall 22 at the level of its first end 26*a*. As with the openings 36, the air intake openings 39 pass transversely through the second wall 26 on either side and open downstream of the trailing edges 23*b* of the fins 23. Each exhaust opening 39 is arranged at a predetermined distance D2 from the first end 26*a* of the second wall 26. Advantageously, the predetermined distance D1, D2 is between 15 and 50 cm. The distances D1, D2 may vary depending on the application of the heat exchanger 21. The air stream escaping from the fins 23 circulates towards the openings 36 to exit the heat exchanger. The air stream leaving the fins may circulate under the second wall 26 in two directions, namely radially and axially. The air stream may circulate below the second wall 26 to the end 26*a* and then flow axially towards the openings 39.

Figure 10:
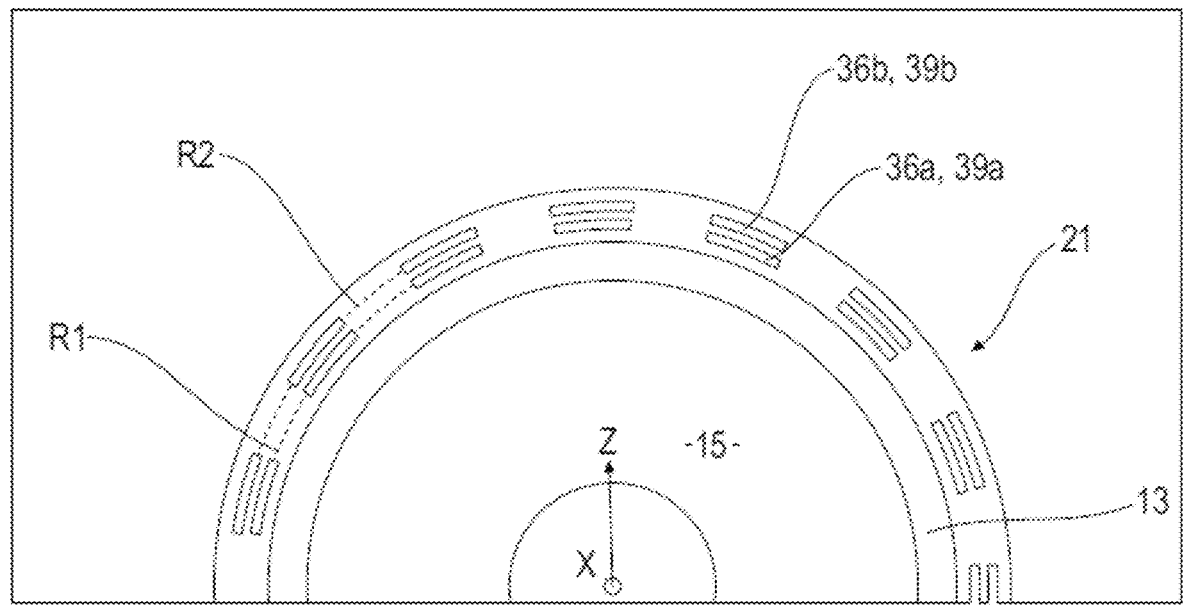
FIG. 10 shows a partial radial cross-section of another embodiment of a heat exchanger according to the invention.

FIG. 10 shows another embodiment of heat exchanger 21. The heat exchanger 21 is similar to that shown in FIGS. 8 and 9. This heat exchanger 21 comprises the intake and exhaust devices 35, 38 arranged upstream and downstream of the fins 23. The air intake openings 36 are formed in the first wall 25 and the exhaust openings 39 are formed in the second wall 26. In particular, the devices 35, 38 each comprise a plurality of openings 36, 39 which are aligned in the first direction and in the same axial plane. Here two openings 36*a*, 36*b* are aligned along the first direction L. This arrangement forms a first annular row R1 of openings 36*a* and a second annular row R2 of openings 36*b*. This configuration of devices allows to improve the flow distribution upstream of the heat exchanger 21, thereby reducing the pressure drops. This also applies to the air stream escaping from the heat exchanger 21 at the level of the openings 39.

Figure 11:
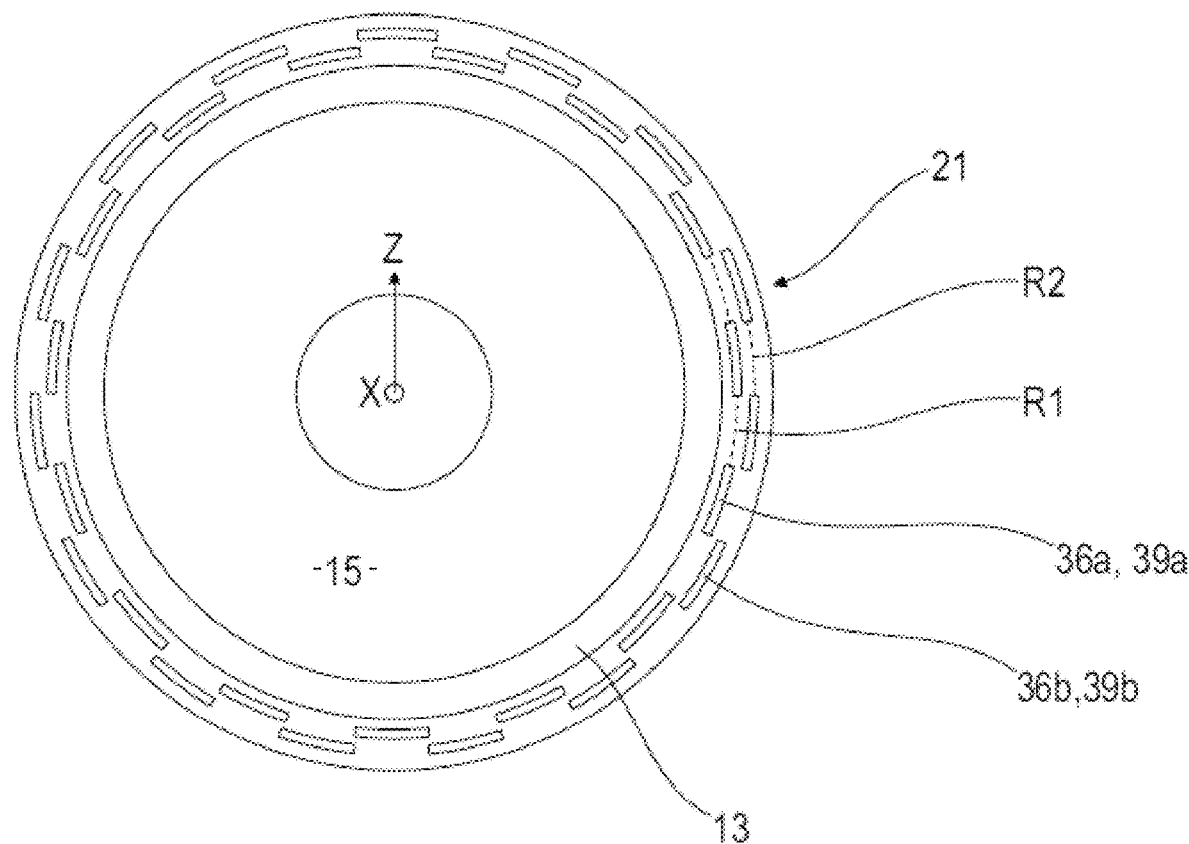
FIG. 11 shows a radial cross-sectional view of another embodiment of the heat exchanger according to the invention.

FIG. 11 shows a variant of previous embodiment in which several openings 36*a*, 36*b* are staggered. This also applies to the openings 39 in the device 38. In particular, the devices 35, 38 comprise the first annular row R1 of openings 36*a*, 39*a* and the second annular row R2 of openings 36*b*, 39*b*. The openings 36*a*, 39*a* in the first row are angularly offset from the openings 36*b*, 39*b* in the second row. The staggered arrangement of the openings 36, 39 allows a uniform flow upstream of the heat exchanger 21. This also applies to the air stream escaping from the heat exchanger 21 at the level of the openings 39.

Figure 12:
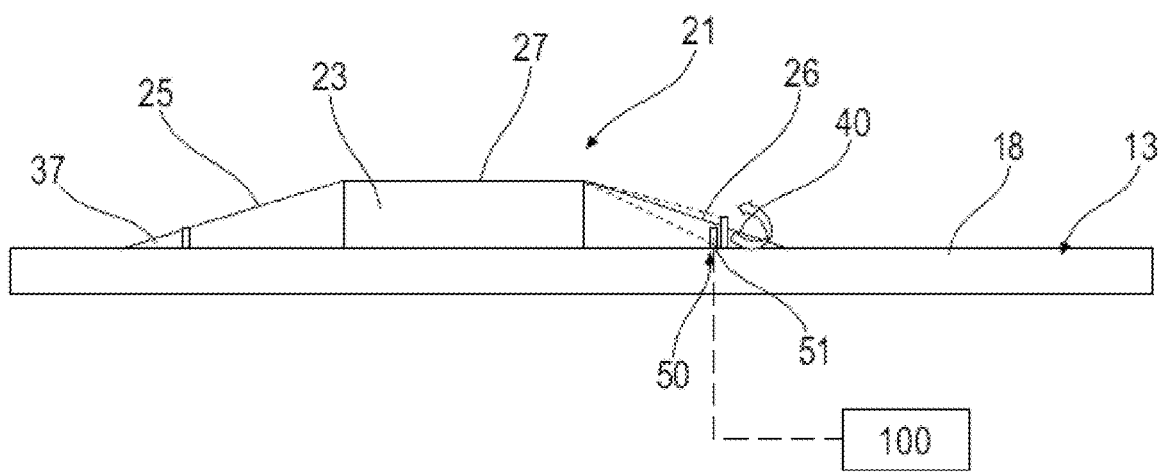
FIG. 12 illustrates another example of embodiment of a heat exchanger equipped with an air flow rate regulation device according to the invention.

FIG. 12 shows another variant of embodiment of the heat exchangers described above. This heat exchanger 21 comprises a flow rate adjustment device 50 configured so as to control the flow rate through the heat exchanger 21 as a function of the aircraft's flight phase. This allows to optimize the aerothermal performance of the heat exchanger 21. For this purpose, the adjustment device 50 comprises movable doors 51 which move at the level of one or more openings 36, 39. In the case of an annular heat exchanger 21 (360°), the adjustment device 50 cooperates with the exhaust device 39. Movable doors 51 are arranged in the openings 39 and move in the second direction so as to vary the cross-section of the openings 38. The movable doors 51 may be moved in the third direction C to vary the cross-section of the openings 39. The movable doors 51 may move in the second direction R and in the third direction C. Alternatively, the movable doors 51 may be rotated.

Alternatively, or additionally, the adjustment device 50 cooperates with the intake device 35 and comprises movable doors that move in the openings 36 to vary their cross-section.

In yet another alternative, certain intake and exhaust openings 36, 39 have no movable doors 51. In this way, the flow rate may be adjusted by completely closing certain air intake and exhaust openings and keeping the others completely open.

The doors 51 are moved according to the temperature of one of the two fluids (hot source and cold source) at the heat exchanger 21 outlet (knowing its inlet temperature) or the thermal power exchanged in the exchanger. To do this, the adjustment device 50 is connected to a control unit 100 such as FADEC (Full Authority Digital Engine Control). Sensors could be arranged on the fluid inlet and outlet ducts and electrically connected to the control unit 100.

Figure 13:
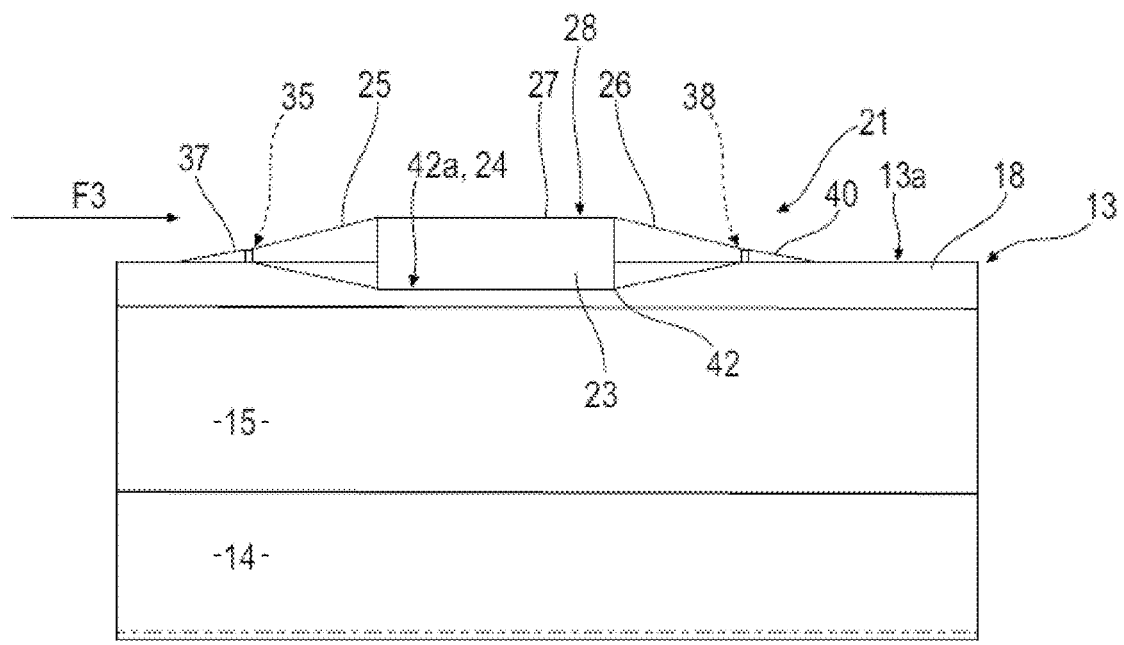
FIG. 13 shows a schematic view in axial cross-section of an example of a semi-buried heat exchanger according to the invention.

FIG. 13 shows another example of embodiment of a heat exchanger 21. This heat exchanger 21 is semi-buried in the nacelle 13. The nacelle 13 comprises a recess 42 in its annular wall 18. The recess 42 has a bottom surface 42a which has a smaller diameter than the radially external surface 13a of the nacelle 13. The recess 42 may be annular or extend over an angular sector of the nacelle 13. The fins 23 extend radially outwards from the bottom surface 42a, which acts as the surface of the support wall. Alternatively, the support wall is arranged on the bottom surface 42a. The fins 23 are buried approximately halfway up the height he of the fins 23. The height he of the fins 23 is greater than the height of the recess 42. The height of the recess 42 is measured between the bottom surface 42a and the radially external surface 13a. The fins 23 are covered by the panel 27 which is connected upstream by the first wall 25 and downstream by the second wall 26. The panel 27 is spaced from and radially outside the wall 18 of the nacelle. The ratio between the first height hi at the level of the air inlet 25a and the second height hs at the level of the air outlet 26a is between 0.5 and 1. This ratio may be different.

The heat exchanger 21 comprises the intake and exhaust devices 35, 38 arranged upstream of the first wall 25 and downstream of the second wall 36. The devices 35, 38 have the same configuration as in the embodiments shown in FIGS. 2 to 7. Partitions 37 extend the first wall 25 upstream and are connected to the wall 18 of the nacelle 13. Partitions 40 may extend the second wall downstream. However, the partitions 37, 40 of the intake device and of the exhaust device extend outside the recess 42. These partitions 37, 40 are evenly spaced to form intake and exhaust openings 36, 39. The air stream F3 enters the heat exchanger 21 through the openings 36 of the air intake device 35 and leaves through the openings 39 of the air exhaust device.

Figure 14:
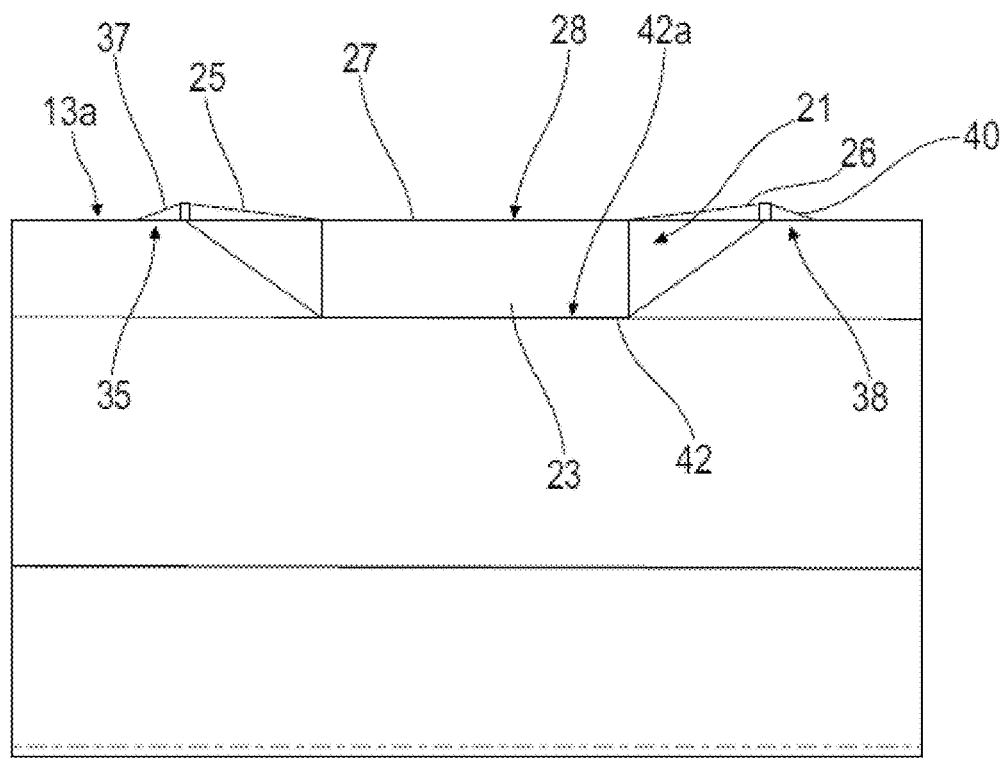
FIG. 14 shows a schematic view in axial cross-section of an example of a buried heat exchanger according to the invention.

FIG. 14 shows another example of embodiment of a heat exchanger 21 buried in the nacelle 13. In this case, the panel 27 has an external diameter which is substantially equal to the diameter of the radially external surface 13a of the nacelle 13. The external surface 28 of the panel is flush with the radially external surface 13a of the nacelle. In this example, the fins 23 are arranged in the thickness of the nacelle and their height he is the same as the thickness. In other words, the height he of the fins 23 is identical to the height of the recess 42. The partitions of the intake and exhaust devices extend outside the recess. The ratio between the first height hi at the level of the air inlet 25a and the second height hs at the level of the air outlet 26a is between 0.5 and 1. This ratio may be different.

The first wall 25 is inclined with respect to the longitudinal axis X and widens from downstream to upstream. Conversely, the second wall 26 is inclined with respect to the longitudinal axis and widens from upstream to downstream. The external dynamic air stream F3 which circulates along the radially external surface 13a of the nacelle 13 enters through the openings 36 of the intake device 35, then towards the fins 23 arranged in the recess 42, then exits through the openings 39 of the exhaust device 38.

Figure 15:
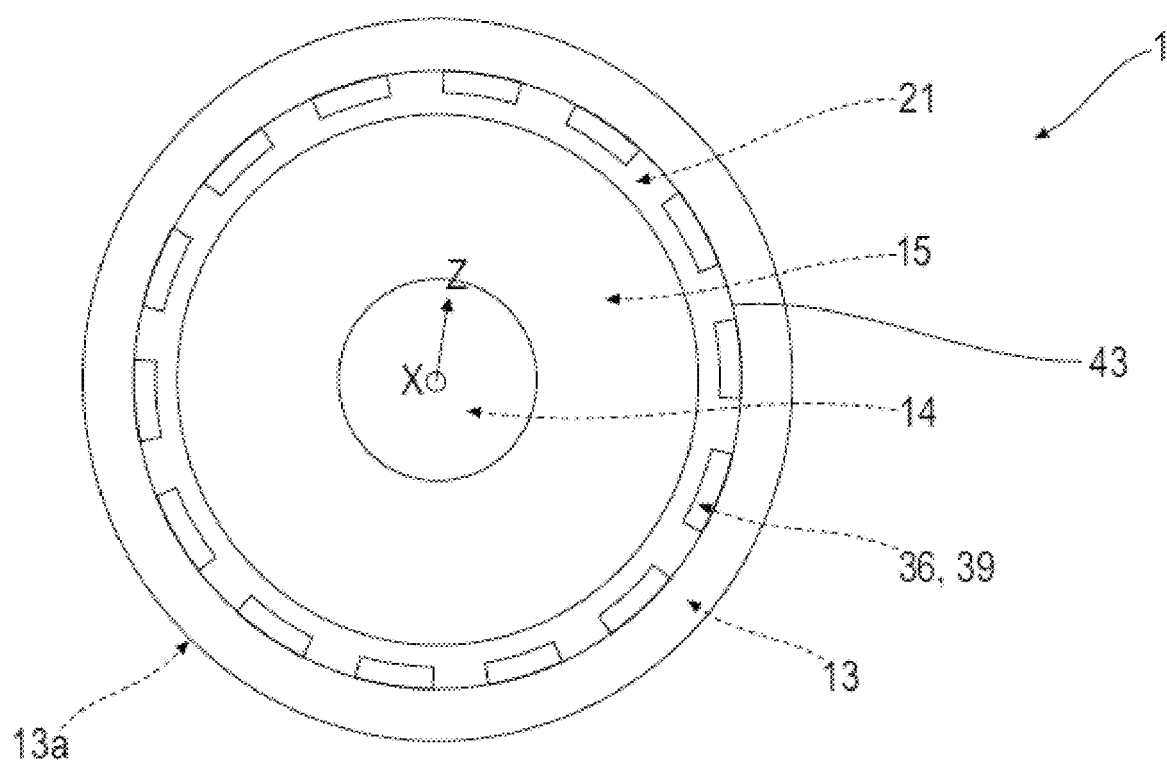
FIG. 15 shows another embodiment of a heat exchanger arranged in a secondary vein of a turbomachine according to the invention.

FIG. 15 illustrates another embodiment of heat exchanger 21. In this figure, the heat exchanger 21 is arranged in the fan casing 12 and the fins 23 are swept by the secondary air stream F2. The heat exchanger 21 is annular and is carried by the entire radially internal wall 43 of the fan casing 12. Alternatively, the heat exchanger 21 is arranged on an angular sector of the fan casing 12. Alternatively, the radially internal wall 43 of the fan casing 12 comprises a recess 42 in which the heat exchanger 21 is arranged so that the fins 23 are buried or semi-buried. In yet another alternative, the fan casing 12 comprises a radially external wall (radially opposite the radially internal wall 42) which carries the heat exchanger 21. The secondary air stream F2 enters the heat exchanger 21 through the openings 36 of the air intake device 35 and leaves through the openings 39 of the air exhaust device.

The invention claimed is:

1. A heat exchanger for a turbomachine having a longitudinal axis, the heat exchanger comprising:
   a support wall extending in a first direction,
   a plurality of fins each rising in a second direction from an external surface of the support wall, the fins being configured to be swept by an air stream in the first direction,
   a first profiled wall arranged upstream of the fins and configured so as to guide and decelerate the air stream entering the heat exchanger,
   a second profiled wall arranged downstream of the fins and configured so as to accelerate the air stream leaving the heat exchanger, and
   a profiled panel covering the fins, the profiled panel extending in the first direction between the first wall and the second wall to which it is attached,
   wherein the heat exchanger comprises an air diffusion system comprising an air intake device configured to decelerate the air stream in a third direction, the device comprising a plurality of separate air intake openings which are arranged upstream of the fins in the first direction and which are distributed in the third direction.

2. The heat exchanger according to claim 1, wherein the first wall has a first end forming an air inlet with the support wall, the air intake device being located upstream of the plane in which the air inlet is defined.

3. The heat exchanger according to claim 1, wherein the first wall has a first end connected to the support wall, the air intake device being located downstream of the plane in which the first end is defined, the air intake openings being formed in the first wall and being arranged at a predetermined distance from the first end of the first wall.

4. The heat exchanger according to claim 1, wherein the diffusion system comprises an air exhaust device configured so as to accelerate the air stream in the third direction, the exhaust device comprising a plurality of separate air exhaust openings which are arranged downstream of the fins in the first direction and which are distributed in the third direction.

5. The heat exchanger according to claim 4, wherein the second wall has a first end forming an air outlet with the support wall, the air exhaust device being located downstream of the plane in which the air outlet is defined.

6. The heat exchanger according to claim 4, wherein the second wall has a first end connected to the support wall, the air exhaust device being located upstream of the plane in which the first end is defined, the intake openings being formed in the second wall and being arranged at a predetermined distance from the first end of the second wall.

7. The heat exchanger according to claim 1, wherein the number of air intake openings of the air intake device and/or of the air exhaust device is between 1 and 100.

8. The heat exchanger according to claim 1, wherein the intake device and/or the exhaust device comprise a plurality of rows of openings, each row comprising openings which are aligned in the third direction, and the openings of the rows being aligned in the first direction or having an angular offset.

9. The heat exchanger according to claim 1, wherein it comprises a flow rate adjustment device, the adjustment device comprising a movable door which is arranged in an opening, the movable door moving in the opening in the first direction and/or in the second direction so as to vary the cross-section of the opening.

10. The heat exchanger according to claim 1, wherein it is annular or extends over an angular sector.

11. A turbomachine having a heat exchanger comprising:
a support wall extending in a first direction,
a plurality of fins each rising in a second direction from an external surface of the support wall, the fins being configured to be swept by an air stream in the first direction,
a first profiled wall arranged upstream of the fins and configured so as to guide and decelerate the air stream entering the heat exchanger,
a second profiled wall arranged downstream of the fins and configured so as to accelerate the air stream leaving the heat exchanger, and
a profiled panel covering the fins, the profiled panel extending in the first direction between the first wall and the second wall to which it is attached,
wherein the heat exchanger further comprises an air diffusion system comprising an air intake device configured to decelerate the air stream in a third direction, the device comprising a plurality of separate air intake openings which are arranged upstream of the fins in the first direction and which are distributed in the third direction, and the turbomachine has a longitudinal axis and includes a fan, an annular casing which is centered on the longitudinal axis, which annular casing surrounds the fan, and the heat exchanger.

12. The turbomachine according to claim 11, wherein the turbomachine comprises a nacelle disposed radially outside the annular casing and around which an external dynamic air is configured to circulate, the heat exchanger being disposed radially outside the nacelle and a portion of the external dynamic air forming the air stream sweeping the fins.

13. The turbomachine according to claim 11, wherein the heat exchanger is disposed radially inside the annular casing in which an air stream is configured to circulate, a portion of the air stream forming the air stream sweeping the fins.

14. The turbomachine according to claim 12, wherein the nacelle or the annular casing comprises an annular wall which comprises a recess in which the heat exchanger is installed, the fins having a height greater than or equal to the height of the recess.

15. The turbomachine according to claim 11, wherein the turbomachine is for an aircraft turbomachine.

\* \* \* \* \*